United States Patent [19]

Gavrila

[11] Patent Number: 4,890,641
[45] Date of Patent: Jan. 2, 1990

[54] FRICTIONAL DAMPER SUITABLE FOR PRESSURE RELIEF VALVES

[75] Inventor: Gelu N. Gavrila, Parsippany, N.J.
[73] Assignee: Teledyne Inc., Teledyne Farris Eng. Div., Palisades Park, N.J.
[21] Appl. No.: 280,574
[22] Filed: Dec. 6, 1988
[51] Int. Cl.[4] ............................................. F16K 21/06
[52] U.S. Cl. ........................................ 137/514; 251/64; 188/67; 188/381
[58] Field of Search ............... 137/514, 514.5; 251/64; 188/67, 271, 381

[56] References Cited

U.S. PATENT DOCUMENTS

| | | | |
|---|---|---|---|
| 2,573,522 | 9/1947 | Watt | 251/64 X |
| 3,048,188 | 10/1957 | Hunter | 137/469 |
| 3,072,143 | 1/1963 | Fleischhacker | 137/514 |
| 3,208,224 | 9/1965 | Hoekstra | 137/514 X |
| 3,227,976 | 1/1966 | Barlow et al. | 188/381 X |
| 3,902,575 | 9/1974 | Nelson et al. | 188/67 |
| 4,462,578 | 7/1984 | Camilleri | 188/381 X |
| 4,481,974 | 11/1984 | Schmitt et al. | 137/514 |
| 4,485,843 | 12/1984 | Wolff | 137/514 |
| 4,494,727 | 1/1985 | Babitzaka et al. | 251/64 |
| 4,522,230 | 6/1985 | Clapper et al. | 251/64 X |
| 4,542,852 | 9/1985 | Orth et al. | 188/381 X |
| 4,606,442 | 8/1986 | Paton et al. | 188/381 |
| 4,613,114 | 9/1986 | Paton | 188/67 X |

OTHER PUBLICATIONS

Teledyne Farris Engineering Product Brochure for Pressure Relief Valves (1988).
Safety Valve Dynamic Instability: An Analysis of Chatter, G. MacLeod, MacLeod Engineering Pty. Ltd., Blackburn, Victoria, Australia, Journal of Pressure Vessel Technology, 172, vol. 107, May 1985.
Dynamic Stability of Safety Valves, T. F. Kondr'eva, V. P. Isakov, and F. P. Petrova, Translated from Khimicheskoe i Neftyanoe Mashinostroenie, No. 12, pp. 14–17, Dec. 1978.
Industrial Sealing Technology—H. Hugo Buchter, A Wiley–Interscience Publication, John Wiley & Sons, New York, pp. 297–299.
Theory and Problems of Continuum Mechanics, George E. Mase, Ph.D., Schaum's Outline Series, McGraw-Hill Book Company, pp. 140–196 (date unknown).
"Precision Valves for Industry", Anderson, Greenwood & Co., Industrial Products Division, Bellaire, Texas, Catalog 150, Jul. 1957.

*Primary Examiner*—John Rivell
*Attorney, Agent, or Firm*—Beveridge, DeGrandi & Weilacher

[57] ABSTRACT

A frictional damper system particularly suited for use in preventing chatter and flutter in a liquid and two phase flow pressure relief valve. The frictional damper system includes one or more damper bodies each having a vertical through-hole and at least one inclined bore extending from the exterior of the damper body into the vertical through-hole. A friction contact member is positioned within each bore and urged inwardly by a spring device or the like. A portion of the object to be damped, such as the stem of a pressure relief valve, extends through the vertical throughhole. The type of material forming the friction member, the degree of compression by the spring device and the amount of inclination of the bore(s) is such that the vertical compression forces components of the damper spring(s) virtually negate the frictional forces created when the member to be damped moves in a first direction. When the member moves in the opposite direction, the vertical compression force components of the damping device are oriented in the same direction as the frictional forces created so that oscillation is avoided.

32 Claims, 8 Drawing Sheets

FRICTIONAL DAMPER SUITABLE FOR PRESSURE RELIEF VALVES

BACKGROUND OF THE INVENTION

1. Field of Invention

This invention relates to a frictional damper. More particularly, this invention relates to a uni-directional frictional damper for self-activated spring-loaded pressure relief valves.

2. Description of the Prior Art

In attempting to avoid chatter and/or flutter and to insure valve stability during valve actuation, valve manufacturers have traditionally relied on the following three methods of damping:

viscous external damping involving the attachment of different hydraulic type viscous dampers to the moving parts;

viscous internal damping greasing ports having a relative movement during actuation;

viscous internal damping through special flow path design including damping orifices; and frictional dampers.

Viscous dampers utilizing grease are relatively effective for small orifice valves at low set pressure. However, for the majority of valve applications, viscous damping has proven to be uneconomical due, in part, to the reliance of such dampers on a large damping area. In addition, viscous damping using grease is heavily dependent upon temperature and cycle count. Therefore, for many valve requirements, such damping means is unavailable and/or untrustworthy.

The damping forces created by viscous hydraulic dampers are proportional to the velocity of the moving parts. Accordingly, viscous hydraulic dampers are ineffective in preventing initiation of oscillation when the velocity of the moving parts is low.

Viscous damping through special flow path design, using the damping orifice approach, has also not led to any significant improvement over the aforementioned damping techniques.

Frictional damping (coulomb) presents another alternative which, although avoiding many of the problems associated with the control of damping fluids, presents many of its own problems such as worn components, jamming and close machine tolerance requirements.

U.S. Pat. No. 4,481,974 to Schmitt et al reveals a frictional damping means for damping valve vibration. In so doing, Schmitt et al provide a number of friction blocks positioned between wedging devices which are subjected to the compression force of a spring clamp. The Schmitt et al device represents a rather complicated frictional arrangement which relies heavily on specific angles being formed in the contacting components as well as careful choices in the types of springs being used. Thus, the Schmitt et al device is susceptible to the problems associated with wear and close tolerances, as well as high manufacturing and assembly costs. In addition, Schmitt et al, which rely on sliding contact between various friction surfaces, presents the additional problem of having the friction blocks becoming inoperative.

SUMMARY OF THE INVENTION

The present invention represents a frictional unidirectional damper which provides a solution to the aforementioned problems faced by the prior art. That is, the present invention, among other things, is simple in design, highly effective, durable, and inexpensive to build, assemble and maintain.

The present invention includes a frictional damper with a damper body having a through-hole and one or more inclined bores which extend inwardly from the exterior surface of the damper body into the through-hole. Each bore contains a friction contact member which is biased inwardly towards the centerline of the through-hole.

Preferably, each bore is arranged such that each friction contact member is biased inwardly and upwardly. Moreover, the upward inclination of the central axis of the bore should intersect the centerline of the through-hole. With such an arrangement, the angle formed between the bore's central axis and the centerline of the through-hole below the point of intersection will be less than 90°. A range of about 60° to 85° has proven most suitable for the purposes of the present invention.

In one embodiment there are two or more bores which each contain a friction contact member. The bores are equally spaced from one another within the damper body. In addition, an external recess is formed in the exterior of the damper body, and a conical sector leaf spring is positioned within the recess. The leaf spring contacts the outer ends of the friction contact members to bias the friction contact members inwardly into contact with any component which extends through the through-hole in the damper body. The surface of the exterior end of each friction contact member is preferably made to conform to the inside shape of the conical sector spring to ensure proper contact therebetween.

The friction contact members are also preferably rod shaped and formed of manufactured carbon - carbon/-graphite although other shapes and composite materials are possible.

In an alternate embodiment of the present invention a plurality of inclined bores originate in the exterior of the upper portion of the damper body, pass through the interior of the body, through the through-hole, and eventually into but not entirely through a lower portion of the damper body. A spring or the like and a friction contact member are positioned within the "different" interior-portion with the spring in contact with the end of the bore hole and the spring interposed between the end of the bore hole and the centerline of the through-hole. Thus, the friction contact member is adapted to come in contact and dampen any component which extends through the through-hole.

In another embodiment, there is a single friction contact member and inclined bore. One or more spacer members are positioned at about the same height as the inner end of the friction contact member. The spacer members may be formed of the same or a different material as that of the friction contact member. A preferred material is one with a relatively low static and kinetic friction coefficient. The friction contact member is biased inwardly by way of a spring within a basket arrangement. The basket is secured within the interior of the bore at the exterior end of the bore. The one or more spacer members extend somewhat into the through-hole so as to prevent the biasing means and friction contact member from forcing any member extending through the through-hole into contact with the wall of the through-hole.

For each of the aforementioned embodiments, the biasing means of the present invention (which include spring devices or the like), bias the friction contact member or members inwardly and upwardly against any component extending through the through-hole. The degree to which the friction contact members are so biased is preferably such that the downwardly directed frictional forces which develop between an upwardly moving component in the through-hole and the friction contact member(s) is essentially negated by upwardly directed compression forces created by the biasing means and the contact member(s) being biased thereby.

The aforementioned frictional damper proves especially suitable for use in a pressure relief valve system. The use of friction contact members formed of a material with nearly equal static and kinetic coefficients of friction, and the upwardly and inwardly inclined positioning of those friction contact members, leads to a stable pressure relief valve. Moreover, the pressure relief valve system of the present invention does not have the problems of chatter faced by the prior art pressure relief valves. As will be further explained hereafter, in a pressure relief valve the problem of valve chatter occurs when the disk covering the inlet port begins to move upwardly and back downwardly against its resting surface.

The friction contact member(s) of the present invention allow for easy upward movement of the stem member which is attached at one end to the movable disk covering the inlet port and passes through the through-hole formed in the damper body. This easy upward movement of the stem is due, in part, to the upward component of the compression force of the biasing device which opposes the downward friction forces that develop during the upward movement of the stem. However, that same upward compressive force of the biasing means, acting on the friction contact member(s), acts to assist in the damping of the stem member on its downward journey so as to prevent the initiation of valve chatter.

TECHNOLOGICAL BACKGROUND

Preferably, the friction damper of the present invention is used in conjunction with a spring loaded selfactivated liquid pressure relief valve having essentially one degree of freedom. Valves of this sort are especially susceptible to chatter especially in high pressure situations. Once the valve starts to chatter, the chatter may lead to the destruction of the valve and associated equipment. A pressure relief valve opens when the fluid pressure exerted on the valve disk exceeds a preset spring force holding the disk down. The cause of chatter is that, at the instant the valve lifts, there is a sudden pressure drop which causes the disk to reseat quickly, and this in turn causes a sudden pressure rise which lifts the valve again; the action continues thus resulting in chatter. The present invention avoids such problems in a manner to be discussed hereafter.

To assist in an understanding of the benefits provided by the present invention, while being utilized in a pressure relief valve, an explanation of the physics governing pressure relief valve operation is provided.

Pressure relief valves working with liquids or so-called incompressible fluids exhibit an inherent loss of stability relative to valves working with gases. This inherent loss of stability is often found in systems where the relief valve is utilized to ensure that the pressure in a vessel does not rise to harmful levels.

Applying Bernoulli's equation (in simplified form) to two points on a streamline of the system leads to the following equation:

$$\rho \frac{V_1^2}{2} + P_1 = \rho \frac{V_2^2}{2} + P_2 = \text{a constant} \quad \text{(i.e. total of the potential, flow and kinetic energy)}$$

with point 1 being inside the pressure vessel protected by the valve, and point 2 being in the immediate area below the disk (i.e., that portion of the relief valve which lifts to provide pressure relief). Accordingly, $V_1$ represents the velocity of the fluid in the vessel at point 1 while $P_1$ represents the pressure of the fluid at point 1. Likewise, the same holds true with regard to $V_2$, $P_2$ and point 2.

When the valve is in a closed position $V_1 = V_2 = 0$ and $P_v = P_1 = p_2$. However, as soon as the pressure in the vessel raises to the point where the relief valve becomes operative, $V_2$ rises. In addition, due to the pressure relief, the local pressure $P_2$ immediately below the moving parts decreases.

Referring back to Bernoulli's equation it is clear that the static pressure (wall) $P_2$ will decrease rapidly since the exponential increase in the kinetic energy ($\frac{1}{2}\rho V_2^2$) will increase rapidly and the energy in the system will remain at the Bernoulli constant. In view of this, the moving parts of the relief valve descend despite the fact the pressure in the vessel continues to increase. When the valve moves in the closing direction the discharged mass flow rate and the velocity $V_2$ decrease in relation to the decreasing lift. Furthermore, $V_2$ decreases, $P_2$ increases, and the increase in $P_2$ eventually results in the valve reopening and the whole process being repeated.

This "built-in" incompressible fluid related behavior at start-to-lift is the starting point for oscillations. A initial frequencies, instability increases in both frequency and amplitude, finally reaching a periodic mode which may destroy the valve and associated equipment.

Therefore, damping is needed to prevent the initialization of oscillation rather than simply the damping of the oscillation once started. The arrangement of the present invention is such that initialization of oscillation is prevented thus avoiding the possibility of a periodic mode developing.

A further requirement of the damping device, needed for effective and efficient operation of the valve, is that the moving parts in an opening or lifting direction not be affected by the use of the damping device. The present invention achieves such a function as it is uni-directional in operation. That is, only the downward or closing motion of the moving parts is appreciably damped by the present invention.

Other advantages and improvements over the prior art will become apparent from the description made hereinbelow with reference to the accompanying drawings.

DETAILED DESCRIPTION OF THE PREFERRED EMBODIMENTS

Figure 1:
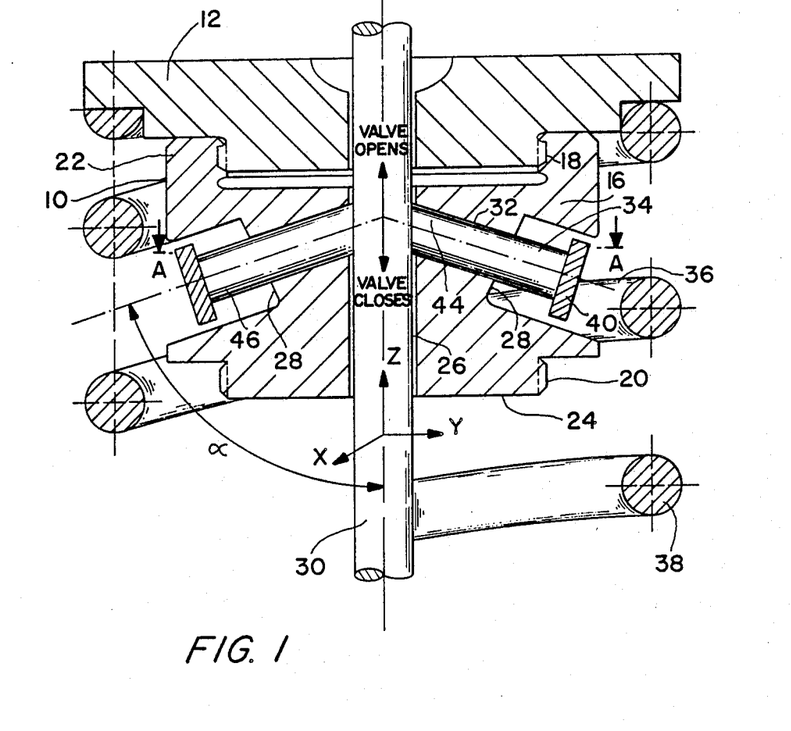
FIG. 1 is a vertical cross-sectional view of one embodiment of the present invention on an upper button of a pressure relief valve.

FIG. 1 shows a Y-Z plane cross-section through one embodiment of a preferred frictional damper 10. The one-staged frictional damper 10 is attached to an upper spring button 12 of a conventional spring activated pressure relief valve. It is noted, though, that the present invention is not limited to self-activated spring loaded valves but may be used for any damping activity especially where the damping of nonstable flowing conditions is involved, for instance the damping of gases, steam, two-phase flow, large valve inlet pressure drop, inlet and outlet header losses, etc.

Figure 2:
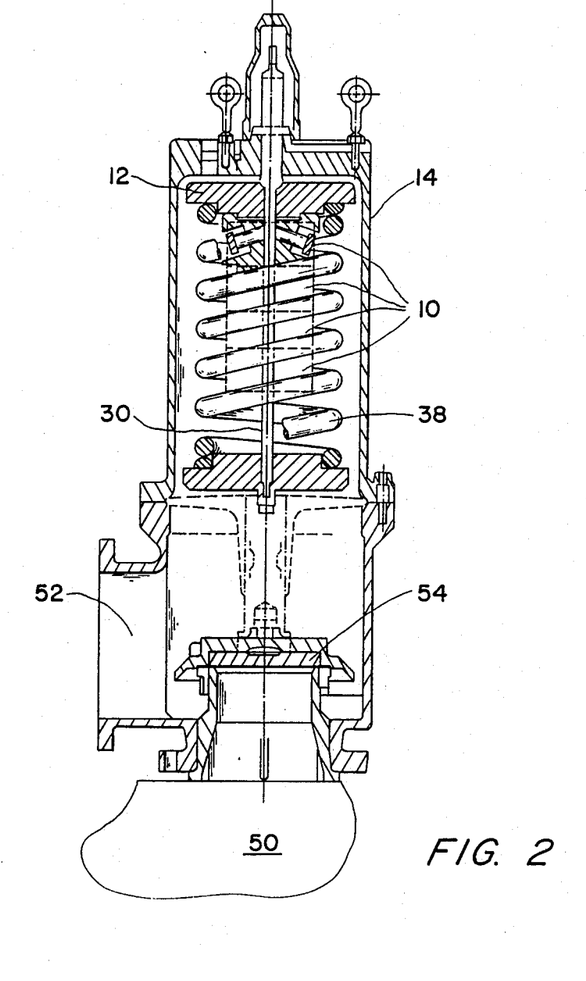
FIG. 2 is a schematic illustration of a series of friction dampers on a pressure relief valve.

The one step frictional damper 10 includes a damper body or stage 16 having internal threads 18 at its upper end 22 and external threads 20 at its lower end 24. Preferably, the damper stage is located inside the helicoidal spring 38 of pressure relief valve 14 (FIG. 2). The internal threads 18 provide attachment means for attaching the one-stage frictional damper 10 to upper spring button 12, also another conventional component of relief valve 14. The bottom end of the body 10 has exterior threads 20 which provide attachment means for another frictional damper 10. Thus, depending upon the degree of damping required, a single damper 10 or a plurality of frictional dampers can be attached end-to-end in spinal like fashion as depicted schematically in FIG. 2. Various other conventional means of attachment such as adhesion o friction fitting are possible alternatives to the threaded attachment means.

Returning to FIG. 1 there is a vertical through-hole 26 extending through the preferably cylindrical shaped damper body 16. The through-hole 26 surrounds, preferably without contact, stem 30 of the pressure relief valve 14. Recess 28 is formed about the periphery of the damper body. The recess extends inwardly at an upward inclination. From the innermost edge of recess 28, a plurality of bores 32 extend further inwardly to the through-hole 26. Each bore 32 receives a friction contact member 34 and has a central axis 36.

Figure 6A:
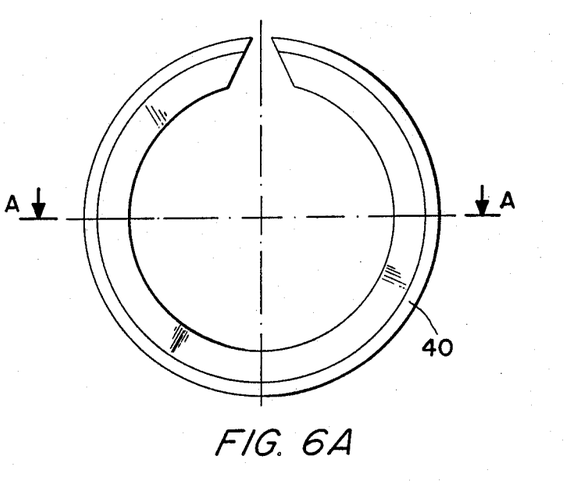
FIGS. 6A AND 6B are planar and sectional views of the spring means in FIG. 1.
Figure 6B:
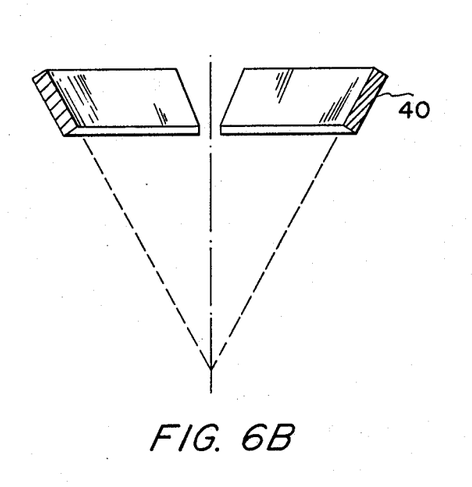

A conical section leaf spring 40, best illustrated in FIGS. 6A AND 6B, is positioned within recess 28 and urges the friction contact members 34 into contact with stem 30. The leaf spring 40 is positioned within the interior of the bore such that the axial movement of the leaf spring is limited.

The friction contact members 34 are preferably formed of a manufactured carbon - carbon/graphite composition.

As used in the present invention, manufactured carbon is a composite material which is (1) a good conductor of heat; (2) self-lubricating such that the material slides on metals without galling or welding; (3) corrosion resistant; and (4) does not soften or melt in use.

The properties of carbon-graphite composites are largely controlled by the fillers and binders used in forming the composite, the forming method, the baking temperature, and the impregnant. Fillers such as coke can produce harder, more abrasive, carbons than can graphite fillers. In the present invention, a low friction coefficient of less than 0.2 and a low wear rate of 0.001 in per-million inches rubbed are preferable. Any composition having essentially the same characteristics as that of the manufactured carbon - carbon/graphite could also be used in the present invention.

The first or inner end 44 of each of the friction contact members has a concave surface which conforms to the exterior of the stem 30. The other end of each friction contact members is preferably formed to conform to the shape of the spring means 40. For example, in FIG. 1 each friction contact member 34 includes a second end 46 which, in cross-section, coincides with the interior surface 48 of conical sector leaf spring 40. In addition, the friction contact members and the stem 30 are preferably of such a nature that the static and kinetic coefficient of friction are as close as possible.

The optimum inclination of the friction contact members is dependent mostly upon the friction coefficients. Therefore, for the embodiment of FIG. 1, while utilizing graphite friction contact members, the preferred inclination is defined by angle $\alpha$ which is preferably less than 90°; more preferably within the range of about 60° to 85°; and even more preferably about 82.5°. Variations in the type of materials for the friction contact member and the stem are possible and most likely will require a change in the angle $\alpha$ to achieve the most effective operation.

Figure 3:
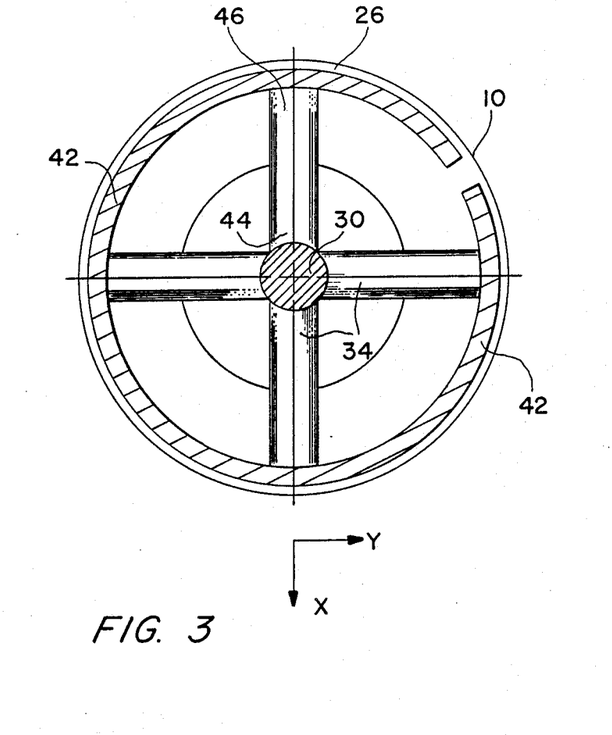
FIG. 3 is a sectional view taken along line A—A of FIG. 1.

FIG. 3 is a cross-sectional view of A—A in FIG. 1 which reveals four friction contact member 34 spaced equidistantly from one another (i.e. 90° apart) within the confines of the conical sector spring 42. The conical sector spring is in a recess 26 of damper body 10. The concave shape of the first end 44 of friction contact members 34 is also represented in FIG. 3. The number of friction contact members 34 is variable depending upon such factors as the degree of damping required in the system. Hence, the number of friction contact members can be more or less than four. For stability, it is also desirable that the friction contact members be spaced equidistantly from one another (i.e., 120° apart for three contact members).

In operation, the present invention when used in a valve environment provides a uni-directional damping function and, in addition, acts to prevent the initiation of valve oscillation. FIG. 2 shows a conventional spring activated relief valve fitted with the novel damping system of the present invention. Upon a significant rise in the pressure of vessel 50, disk 54 will begin to lift resulting in relief of pressure vessel 50 through exhaust port 52. As the disk lifts, so does stem 30.

The uni-directional damping function of the present invention as well as the prevention of the initialization of oscillation is highly dependent on the proper choice of friction contact material, the compressive forces developed by the spring means acting in coordination with the friction contact members, and the degree of inclination of the friction contact members.

Figure 9A:
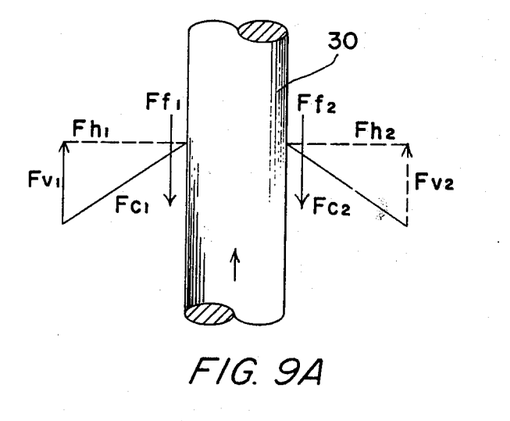
FIGS. 9A and 9B are force vector diagrams for the present invention.

FIG. 9A is a vector diagram for when the stem is moving upwardly and downward frictional forces are being developed. The present invention is uni-directional in that the upward compression forces minus the friction forces equals approximately zero (i.e. for two friction contact members, $(Fv_1+Fv_2)-(Ff_1+Ff_2)=0$). A suitable inclination angle can be determined from the known friction coefficients of the materials to be utilized.

Figure 9B:
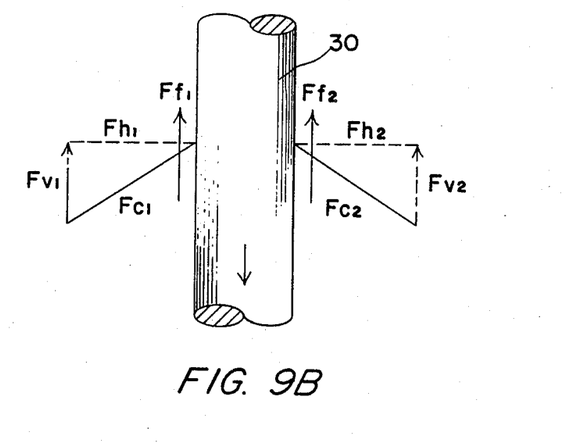

FIG. 9B reveals the vector diagram for when the stem is moving downwardly and the friction damper is acting to prevent the initiation of oscillation of the disk and stem. In this situation, the frictional forces developed ($Ff_1$, $Ff_2$) are upward as are the vertical components of the compression forces ($Fv_1$, $Fv_2$). Hence, the downward motion of the stem and disk, brought about in part by the downward force of helical spring 38 and the rapid decrease in the static pressure wall, is damped by the opposing forces of the spring means 40 and the friction forces developed between stem 30 and friction contact members 34. That is, the upward force vector of the spring and the upward friction force vector combine to create a damping means adapted to prevent the initiation of oscillation in the moving parts of the valve. Again, the damping forces can be varied in many ways including selection of material for the friction contact members, selection of the number of damping stages, number and size of friction contact members per stage and changing compression of spring means 40.

Figure 4:
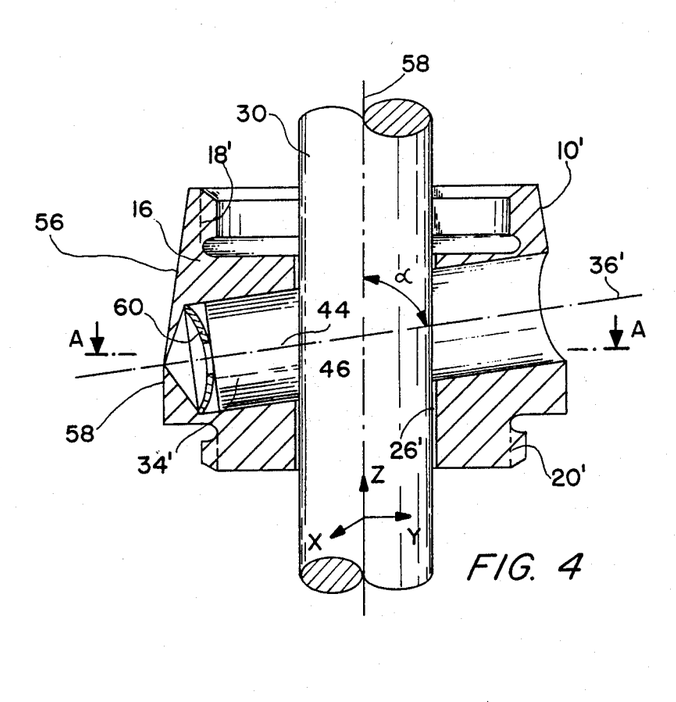
FIG. 4 is an alternate embodiment of the friction damper of the present invention.
Figure 5:
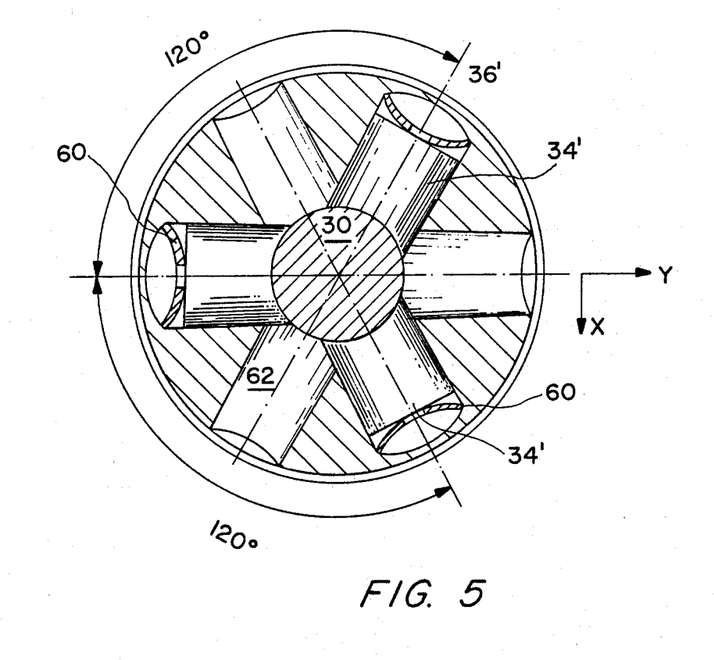
FIG. 5 is a sectional view taken along line A—A in FIG. 4.

FIGS. 4 and 5 show an alternate embodiment of the present invention. Frictional damper 10' includes damper body 16' having internal threads 18' and exterior threads 20' as in the embodiment of FIG. 1. The exterior of the frictional damper body has a conical section 56 and a cylindrical section 58. A plurality of downwardly inclined bores are formed within the interior of damper body 16'. Each centerline 36' of a bore is at an angle $\alpha$ from the centerline of the vertical through-hole 26' passing through the center of damper body 16'.

Each of the downwardly inclined bores originate, for the most part, at the mid portion of the conical section 56 and extend through the through-hole and close to, but not entirely through, the lower portion of the conical section 56 and the upper portion of cylindrical section 58. Stem 30 extends vertically through the through-hole when the frictional damper is used with pressure relief valve 14. The portion of the bore which extends from the blocked end of the bore to the vertical through-hole contains a frictional contact member 34'. Frictional contact member 34' has an end 44' preferably conforming to the external surface of the stem member 30 and a second end 46' in abutment with an elastic element 60.

The angle $\alpha$ is again mostly friction coefficient dependent and generally less than 90°. For graphite friction contact members a preferred angle for $\alpha$ is about 60° to 85° and more preferably about 82.5°.

FIG. 5 features a sectional view along lines A—A of FIG. 4. As seen, there are three bores 62, each containing a friction contact member 34' and elastic member 60. The frictional contact members are equally spaced from one another so that they are each separated by 120°. In addition, elastic elements 60 can include a wave spring washer or stack, a curved spring washer, a Belleville spring washer or the like.

Figure 7:
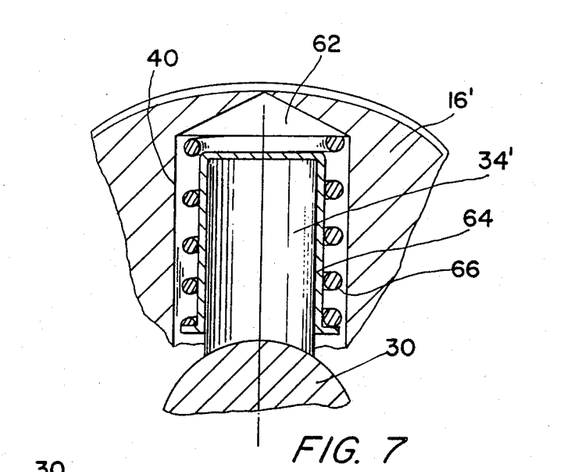
FIG. 7 is an alternative embodiment of the spring means in the present invention.

FIG. 7 reveals an alternate spring means 66 which utilizes bores like those of FIG. 4. Helicoidal spring 66 is compressed into the closed end of bore hole 62 formed in damper body 16' and a flanged receiving basket 66 surrounds the end of friction contact member 34'.

Figure 8:
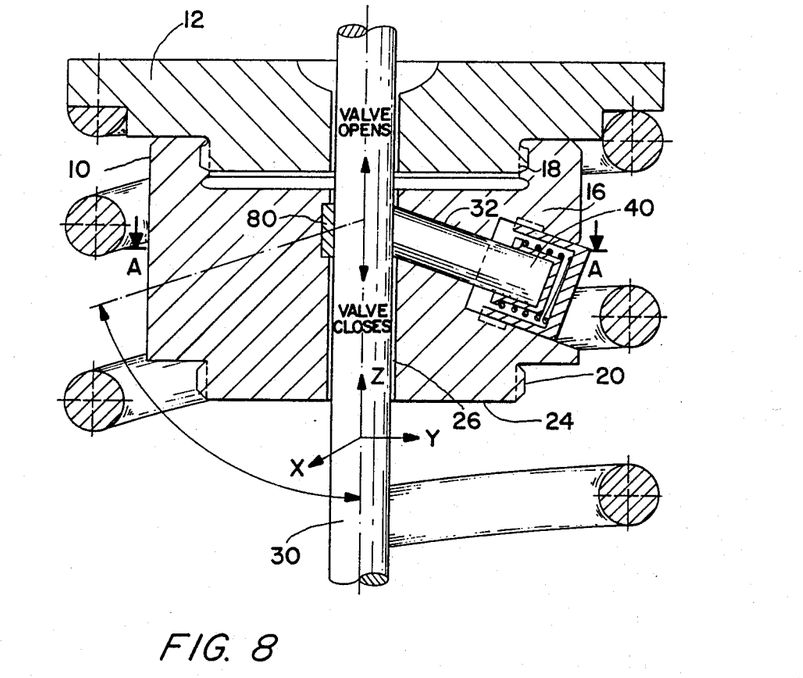
FIG. 8 is a cross-sectional view of a further embodiment of the present invention.

FIG. 8 illustrates an alternate embodiment of the present invention which is applicable in some valve environments. In FIG. 8 only a single frictional contact member 34 is utilized and, for stability, one or more spacing members are provided. A spacing member 80 is diametrically opposed from contact member 44 on the surface of through-hole 26. This embodiment is somewhat less desirable from the viewpoint of providing a uni-directional damper member in that it is more difficult to negate the frictional forces being developed between the stem liner member and the single friction contact member. It is also more difficult to provide increased upwardly directed spring forces. Nevertheless, the embodiment is applicable in some valve environments and has, with regard to friction contact material, the capability of material cost savings. The spacing member(s) 80 prevent the component being damped from contacting the wall of the through-hole. The spacing member(s) 80 can be formed of the same or different material as that of friction contact member 32. Preferably the spacing member is of a material with relatively low static and kinetic coefficient of friction valves when in contact with the component to be damped.

It will be understood that modifications within the scope of the appended claims may be made in the design and arrangements of the present embodiments without departing from the spirit of the invention.

What is claimed is:

1. A frictional damper for damping a reciprocating member, comprising:
   a damper body having an exterior surface which includes a bottom surface, a top surface, and a side surface extending between the top surface and the bottom surface, said damper body including a through-hole extending through said top surface and said bottom surface, said damper body further including at least one inclined bore extending inwardly from the exterior surface of said damper body and into said through-hole;
   at least one friction contact member which is positioned in said at least one inclined bore;
   biasing means for biasing said at least one friction contact member towards the reciprocating member extending through said through-hole such that the effect of the frictional forces which develop between the moving reciprocating member and said abutting friction contact member, while said reciprocating member moves in one axial direction, are essentially negated by compression forces created by said biasing means and said friction contact member.

2. A frictional damper as recited in claim 1 wherein said at least one inclined bore slopes upwardly from said exterior surface to said through-hole.

3. A frictional damper as recited in claim 2 wherein said at least one inclined bore includes a central axis which intersects at a point with the centerline of said through-hole such that an angle of less than 90° is formed between the central axis and that portion of the centerline extending below the point of intersection.

4. A frictional damper as recited in claim 3 wherein said angle is within a range of about 60° to 85°.

5. A frictional damper as recited in claim 2 wherein there are at least two friction contact members, a recess is formed in the exterior of said damper body, and said biasing means comprises a conical sector leaf spring positioned within said recess, at least two inclined bores each having said friction contact member contained therein, and said conical sector leaf spring is in contact with a first end of each of said friction contact members.

6. A frictional damper as recited in claim 5 wherein said first end of each of said friction contact members has a cross-section matching an interior surface of the conical sector spring, each of said friction contact members having a second end which is shaped to conform to an outer surface of a cylindrical object.

7. A frictional damper as recited in claim 1 wherein said friction contact member is a manufactured carbon - carbon/graphite rod.

8. A frictional damper as recited in claim 7 wherein there are at least three of said manufactured carbon - carbon/graphite rods equally spaced from one another.

9. A frictional damper assembly as recited in claim 1 wherein there are at least two of said inclined bores each extending from the exterior surface of said damper body, through a first interior portion of said damper body, through said through-hole and into, but not entirely through, a second interior portion of said damper body.

10. A frictional damper as recited in claim 9 wherein said biasing means includes a plurality of spring devices each positioned within a respective one of said second interior portions, and a plurality of friction contact members each positioned within a respective one of said second interior portions between said spring device and the center line of said through-hole.

11. A frictional damper as recited in claim 10 wherein each of said spring devices includes a helical spring and a flanged receiving basket for receiving one end of a friction contact member.

12. A frictional damper as recited in claim 1 wherein said damper body has attachment means near the top and bottom surfaces thereof.

13. A uni-directional frictional damper system for pressure relief valves, comprising:
   at least one damper stage adapted to be attached to the pressure relief valve, said damper stage having a body which includes a through-hole adapted to receive therethrough a vertically movable stem of the pressure relief valve;
   at least one friction contact member positioned in an inwardly and upwardly inclined position within said body;
   biasing means for biasing said friction contact members into abutment with the stem passing through the through-hole in said body and said biasing means biasing said inclined friction contact member into the stem such that the effect of downwardly directed frictional forces which develop between an upwardly moving stem and said abutting friction contact member is essentially negated by upwardly directed compression forces created by said biasing means and said friction contact member.

14. A frictional damper system as recited in claim 13 wherein said friction contact member is formed of manufactured carbon - carbon/graphite.

15. A frictional damper system as recited in claim 13 wherein said damper body includes at least one bore which opens into said through-hole and contains said friction contact member.

16. A frictional damper system as recited in claim 15 wherein two or more friction contact members are approximately equally spaced from one another within said body.

17. A frictional damper system as recited in claim 15 wherein said inclined bore includes a central axis which intersects at a point on the centerline of said through-hole such that an angle within the range of about 60° to 85° is formed between the central axis of the bore and the centerline of the through-hole below the point of intersection.

18. A frictional damper system as recited in claim 17 wherein a recess is formed in the exterior of said body, and said biasing means comprises a conical sector leaf spring positioned within said recess and in contact with a first end of at least one friction contact member.

19. A frictional damper system as recited in claim 17 wherein said biasing means includes a helical spring and a flanged receiving basket for receiving a first end of said friction contact member.

20. A frictional damper system as recited in claim 13 further comprising a plurality of damper stages each connected to one another about the stem in a spinal column type arrangement.

21. A frictional damper system as recited in claim 13 further comprising:
   a pressure relief valve which includes a housing which has an inlet port, and an exhaust port,
   a member for preventing fluid flow between said inlet and exhaust ports, said member adapted to lift upwardly when a predetermined pressure is surpassed,
   a stem attached to said member, said stem lying in said damper through-hole.

22. The invention as recited in claim 21 having first and second spring buttons, said first spring button attached to said damper stage and said second spring button attached to said stem; said invention further including a helicoidal spring interposed between said first and second spring buttons and surrounding said damper stage.

23. The invention as recited in claim 21 wherein said contact member is formed of manufactured carbon - carbon/graphite.

24. The invention as recited in claim 21 wherein said damper body includes at least one bore which opens into said through-hole and contains said contact member.

25. The invention as recited in claim 24 wherein two or more friction contact members are approximately equally spaced from one another within said body.

26. The invention as recited in claim 24 wherein said bore includes a central axis which intersects at a point on the centerline of said through-hole such that an angle within the range of about 60° to 85° is formed between the central axis of the bore and the centerline of the through-hole below the point of intersection.

27. The invention as recited in claim 26 wherein a recess is formed in the exterior of said body, and said biasing means comprises a conical sector leaf spring or springs positioned within said recess and in contact with a first end of said at least one friction contact member.

28. The invention as recited in claim 26 wherein said biasing means includes a helical spring and a flanged receiving basket for receiving a first end of said friction contact member.

29. The invention as recited in claim 21 further comprising a plurality of damper stages each connected to the other in a spinal column type arrangement.

30. A uni-directional frictional damper system for pressure relief valves, comprising:
- at least one damper stage adapted to be attached to the pressure relief valve, said damper stage having a body which includes a through-hole adapted to receive therethrough a movable stem of the pressure relief valve;
- at least two friction contact members positioned in an inclined position within said body relative to said through hole; and
- biasing means for biasing said friction contact members into abutment with the stem passing through the through-hole in said body.

31. A uni-directional frictional damper as recited in claim 30, wherein there are three of said inclined friction contact members each contacting the stem at essentially the same level.

32. A uni-directional frictional damper system for pressure relief valves, comprising:
- at least one damper stage adapted to be attached to the pressure relief valve, said damper stage having a body which includes a through-hole adapted to receive therethrough a movable stem of the pressure relief valve;
- at least one friction contact member positioned in an inclined position within said body relative to said through-hole, said friction contact member being formed of manufactured carbon - carbon/graphite; and
- biasing means for biasing said friction contact members into abutment with the stem passing through the through-hole in said body.

* * * * *